Jan. 25, 1955 W. B. GRUBER 2,700,322
STEREOSCOPIC PICTURE PROJECTION APPARATUS
Filed March 2, 1950 4 Sheets-Sheet 2
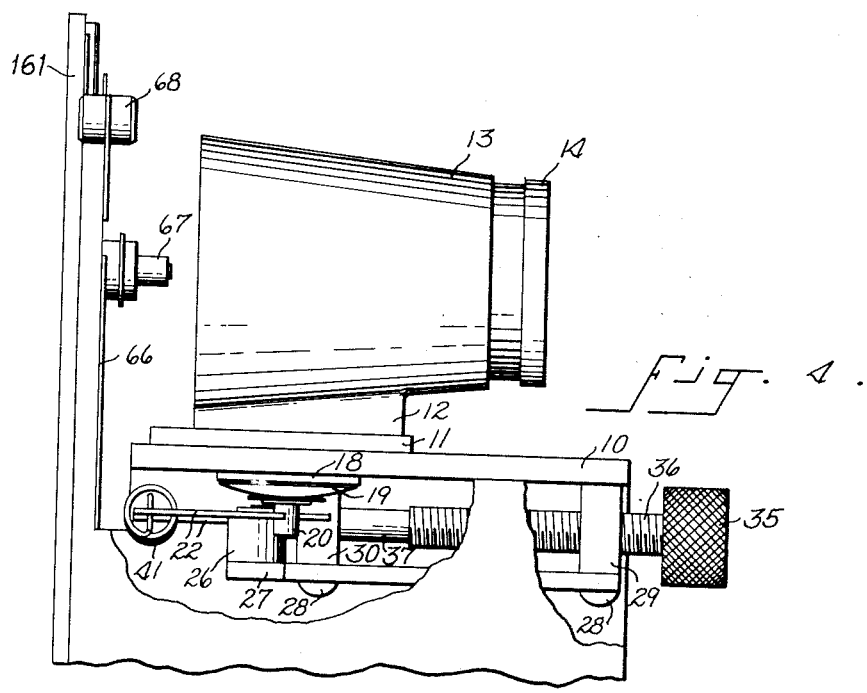
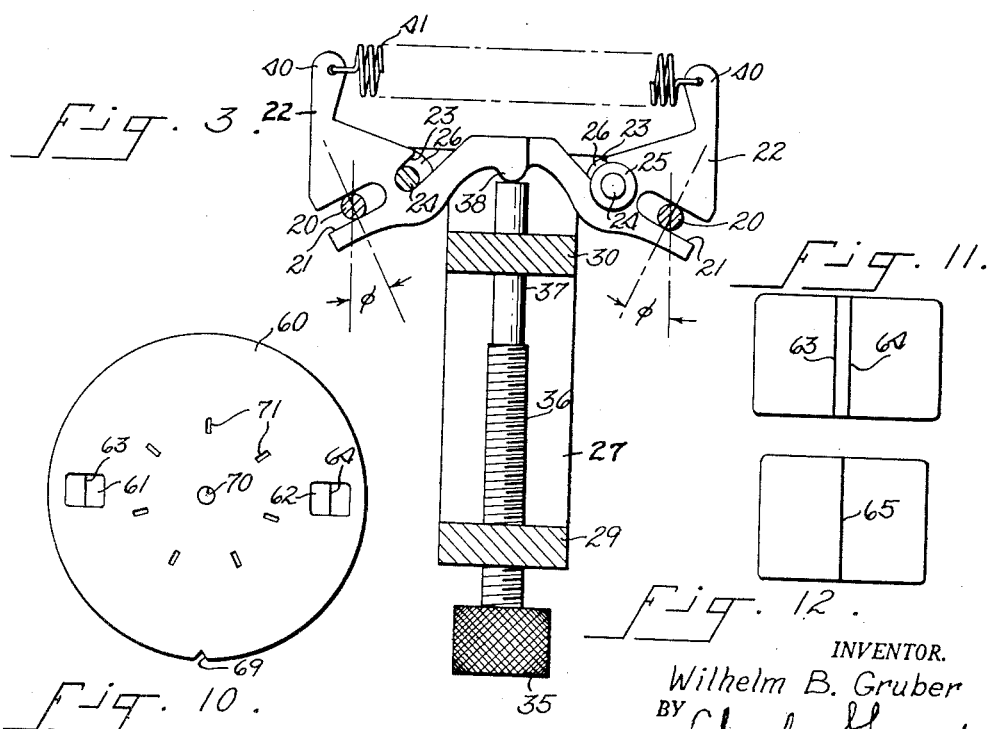
INVENTOR.
Wilhelm B. Gruber
BY Charles Shepard
Attorney Jan. 25, 1955     W. B. GRUBER     2,700,322
STEREOSCOPIC PICTURE PROJECTION APPARATUS
Filed March 2, 1950     4 Sheets-Sheet 3

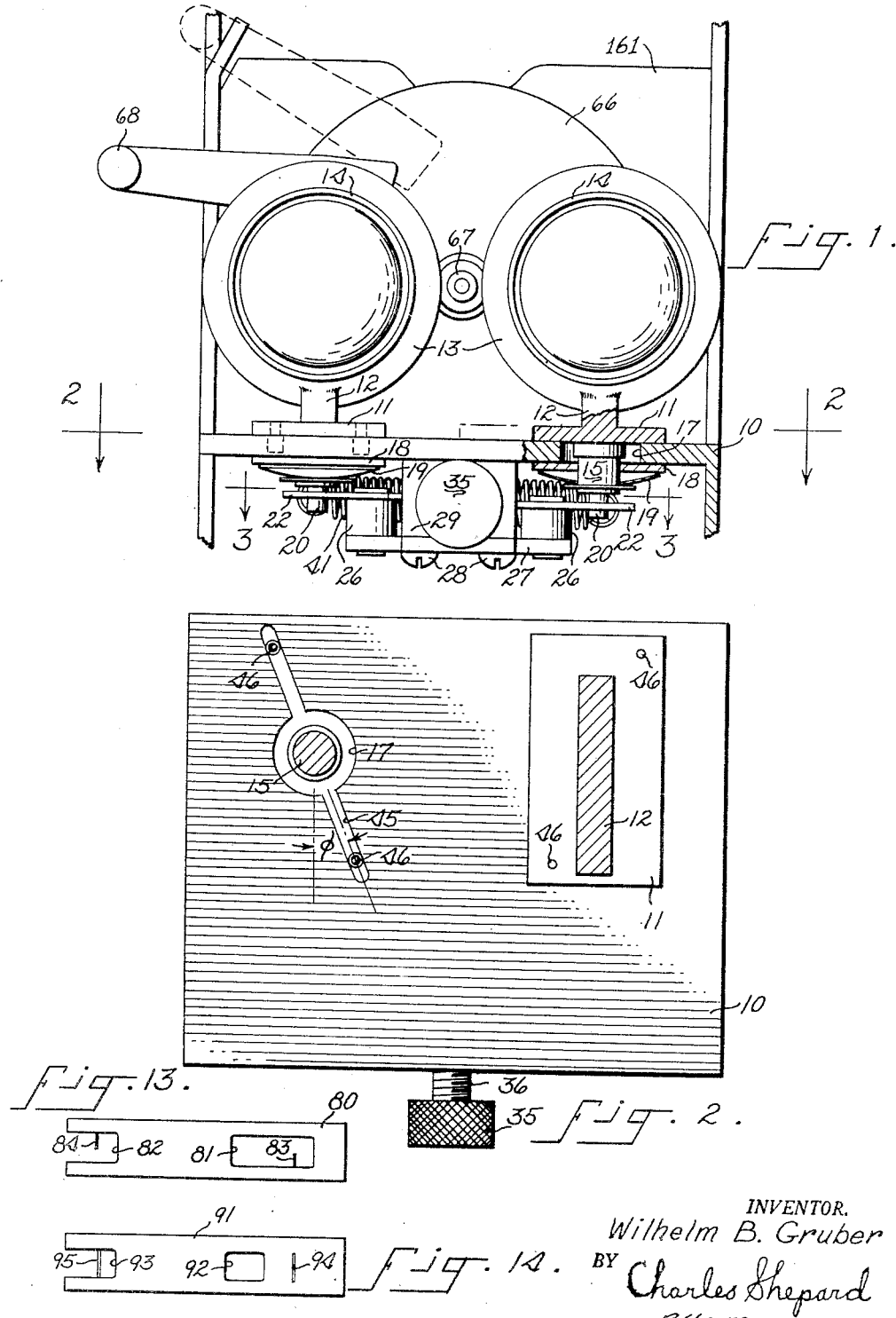

INVENTOR.
Wilhelm B. Gruber
BY Charles Shepard
Attorney

Jan. 25, 1955     W. B. GRUBER     2,700,322
STEREOSCOPIC PICTURE PROJECTION APPARATUS
Filed March 2, 1950     4 Sheets-Sheet 4
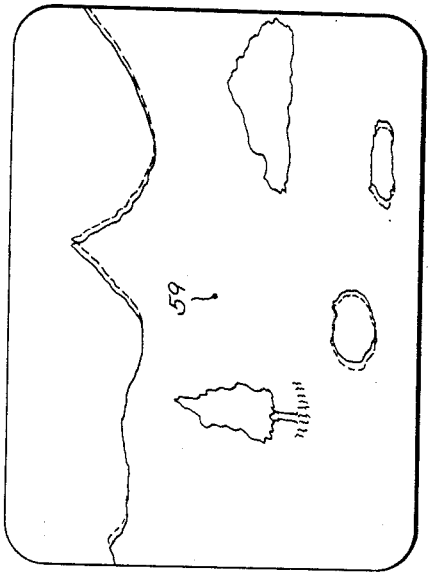
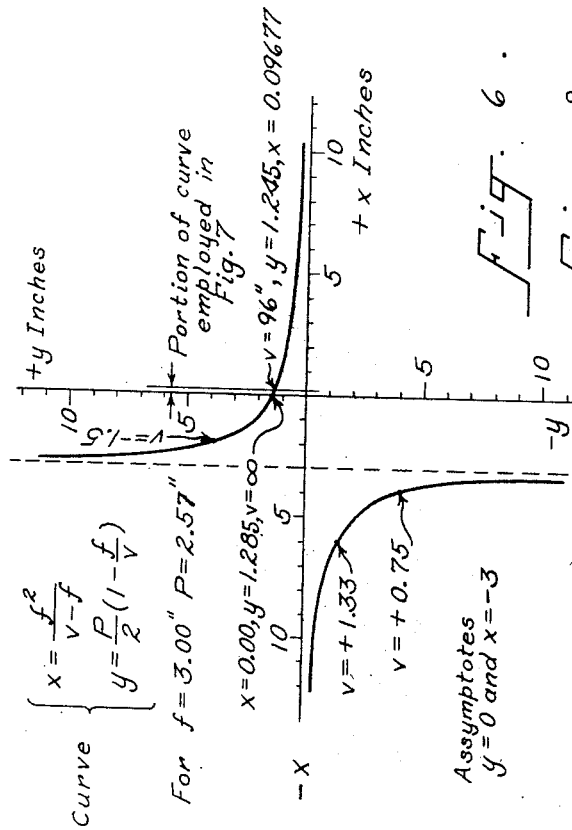
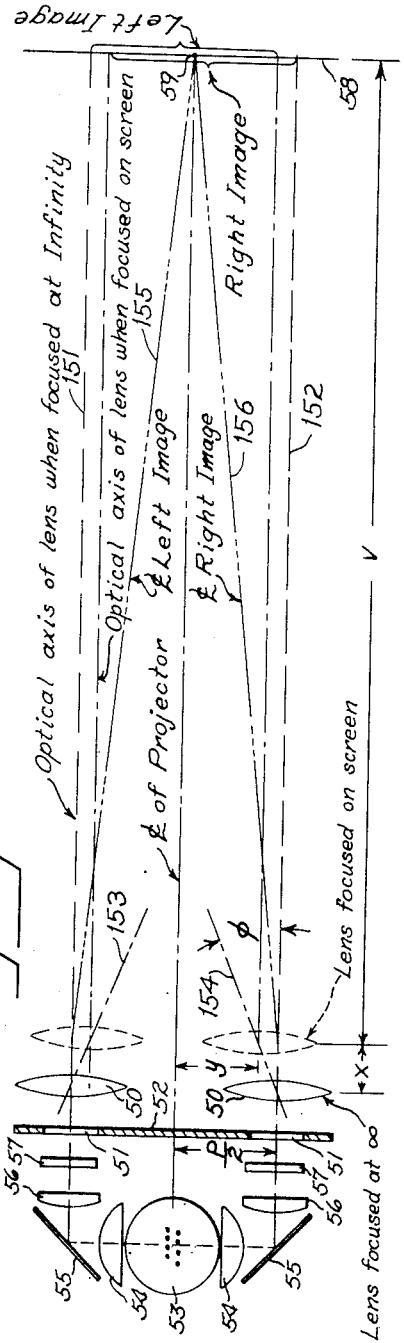
INVENTOR.
Wilhelm B. Gruber
BY Charles Shepard
Attorney United States Patent Office 2,700,322
Patented Jan. 25, 1955

2,700,322

STEREOSCOPIC PICTURE PROJECTION APPARATUS

Wilhelm Biller Gruber, Portland, Oreg., assignor, by mesne assignments, to Sawyer's Inc., Portland, Oreg., a corporation of Oregon Application March 2, 1950, Serial No. 147,305

13 Claims. (Cl. 88—27)

The present invention relates to a means for stereoscopic picture projection, and more particularly to a means for accurately focusing a stereoscopic projector and for accurately superimposing the desired corresponding points of the two companion stereoscopic images.

As is well understood in the art, a stereoscopic projector, whether of still pictures or of motion pictures, projects onto a screen or other viewing surface two different pictures or images (sometimes called stereographs) representing reproductions of two different photographs of the same object or scene taken from two slightly different points. For ordinary or life-like stereoscopic results, the two pictures are taken from two points separated from each other by approximately the average pupillary distance, which is approximately 65 millimeters, varying somewhat with different individuals. For certain special purposes, such as photographic mapping or military reconnaissance photography, the two photographs of the same scene may be taken from points separated farther from each other than the pupillary distance. But in either case, the two similar but slightly different pictures of the same scene taken from the somewhat separated points, must both be clearly and sharply focused on the projection screen or other viewing surface. If the projected images are of any substantial width greater than the pupillary distance, they must be overlapped onto each other to a sufficient extent so that the angle between the lines of sight from the observer's left eye to any given point of the projected image of the left stereograph, and from the observer's right eye to a corresponding point of the projected image of the right stereograph, will be sufficiently small to avoid eye strain.

Suitable blocking means is provided for insuring that one eye of the observer will see only one projected image (that is, the reproduction of the picture taken from one point) while the other eye of the observer will see only the other projected image (that is, the reproduction of the picture taken from the second point somewhat spaced from the first taking point). Such blocking means may be of various forms already well known in the art; for example, separate rotating shutters associated with the separate eyes of the observer, and synchronized with rotating shutters used on the projecting apparatus; or, more conveniently and simply, the well known light polarizing arrangement whereby the two projected images are plane polarized in two different planes, and are viewed through separate plane polarizing spectacles or filters associated with the eyes of the observer. Such arrangements are well known, and need not be discussed in detail.

In order that the two separate projected images when separately viewed by the two eyes of the observer may be fused in the brain of the observer to form a single stereoscopic or third-dimensional image or sensation, with the greatest clarity and maximum depth perception or third-dimensional effect, it is necessary that the two projected images both be sharply focused, and that both be equally well or equally sharply focused, on the screen or other projection surface. Also, in order that the observer may incur minimum eye strain or fatigue, it is desirable that the proper parts of the two projected images be accurately superimposed on each other. It is to these features of accurate and equal focusing of both projected images, and of accurate and proper superimposition of the desired parts of the two images, that the present invention particularly relates.

In the prior art of stereoscopic projectors, the usual practice has been to provide the two projection lenses for the two images with two separately operable focusing adjustments, and the operator, in setting up the apparatus for a projection run, has had to focus each image beam of light separately, relying upon his own vision (often faulty) to tell him when each separate beam was properly focused, and when both beams were focused equally sharply. Also, the common practice has been to rely upon the skill and experience of the operator or projectionist in producing the desired overlapping or superimposition of the two images. This has been unsatisfactory, because different projectionists have had different ideas as to which corresponding points of the two images should be superimposed on each other, and apparently no projectionist has had any clear idea of which corresponding points should be superimposed in order to produce minimum average eye strain when viewing average pictures without readjustment of the projector during the projection sequence.

These defects are avoided according to the present invention, wherein the use of a novel method and the provision of novel apparatus enables the beams of light of both projected images to be accurately focused with great clarity or sharpness, by a single adjustment, substantially independently of the acuity of the vision of the projectionist, and substantially independently of his skill or experience, and also enables proper parts of the two projected images to be superimposed on each other in a manner to minimize the eye strain of the observer and in a manner whereby the superimposition remains permanently set throughout any given projection run, without requiring changes in superimposition adjustment for successive scenes of a motion picture or successive slides of a series of still pictures.

These and other desirable objects are accomplished by the construction disclosed as an illustrative embodiment of the invention in the following description and in the accompanying drawings forming a part hereof, in which;

Fig. 1 is a front elevation of the principal portions of a stereoscopic projector constructed according to the present invention, with parts broken away and parts in vertical section;

Fig. 2 is a view of the same partly in plan and partly in horizontal section taken substantially on the line 2—2 of Fig. 1;

Fig. 3 is a horizontal section taken substantially on the line 3—3 of Fig. 1;

Fig. 4 is a side elevation of the projector, with parts broken away;

Fig. 6 is a diagram illustrating the mathematical curve along which the optical centers of a pair of lens assemblies should move when focusing a pair of stereoscopic beams upon a projection screen at different distances, together with certain of the mathematical formulae relating to such curve;

Fig. 8 is a schematic or diagrammatic view illustrating the principles of the present invention;

Fig. 9 is a schematic view illustrating a pair of stereoscopic images superimposed on a projection screen in accordance with the present invention;

Fig. 10 is a front face view of a range finder transparency holder forming part of the present invention;

Fig. 11 is a diagrammatic view of the projected images of the range finder transparencies shown in Fig. 10, in a position corresponding to incorrect focusing of the apparatus;

Fig. 12 is a view of the same projected images as they appear when the apparatus is properly focused;

Fig. 13 is a front face view of a modified form of range finder device; and

Fig. 14 is a similar view of another modified form of range finder device.

The same reference numerals throughout the several views indicate the same parts.

Figure 5:
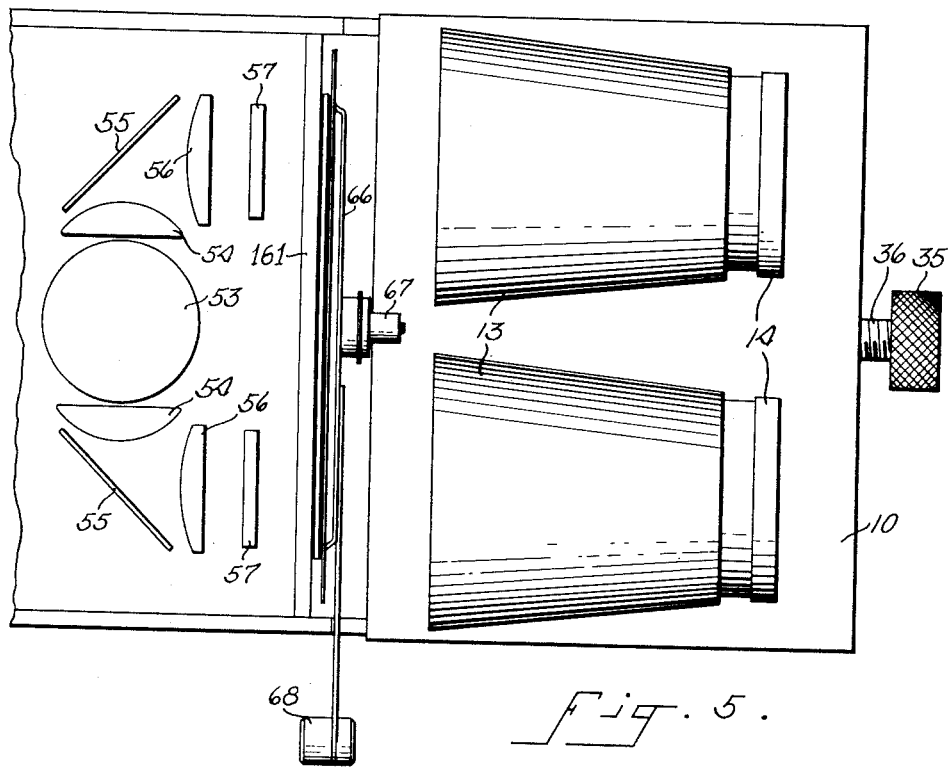
Fig. 5 is a plan of part of the projector, with the stereoscopic beam producing portion thereof illustrated schematically.

As has been mentioned above and as is well known in the art, the production of a stereoscopic or three-dimensional effect when viewing plane reproductions of a three-dimensional object rather than viewing the actual three-dimensional object itself, involves the use of two separate plane reproductions of the object, one reproduction showing the object when viewed from one position and the other reproduction showing the object when viewed from a slightly different position, and further involves the placing of these two plane reproductions in such position that one of them may be viewed only by one eye of the observer and the other may be viewed only by the other eye of the observer. If both plane reproductions (that is, the projected images of the stereographs) are equally sharp and distinct, and if corresponding points on the two reproductions are spaced from each other by a distance no greater than the pupillary distance between the eyes of the observer, or at least not much greater than such pupillary distance, the brain of the observer will fuse the two physiological images of the two reproductions into a single stereoscopic or three-dimensional image the same or substantially the same as though the observer were viewing the original three-dimensional object rather than the plane reproductions or pictures thereof. But if either of the plane reproductions is more fuzzy or indistinct than the other (as for example in the case of unequal focusing on a projection screen) then the stereoscopic effect in the brain of the beholder is diminished and, in aggravated cases, may be entirely absent.

If corresponding points on the two plane reproductions are spaced from each other by a distance greater than the pupillary distance between the eyes of the observer, then in order to focus the eyes properly on these two corresponding points, one eye looking at one point and the other eye looking at the other point, it would be necessary for the eyes to look along divergent lines rather than parallel or convergent lines. In a person with normal vision, if this divergence does not exceed a relatively small angular value (usually about 2½ or 3 degrees), stereoscopic fusion in the brain will still occur, but viewing will be accompanied by eye strain or eye muscle fatigue, because of the disruption of the delicate normal balance or coordination between eye accommodation (distance focusing) and eye convergence. If corresponding points on the two plane reproductions are spaced from each other by a distance equal to or less than the pupillary distance between the eyes of the observer, the vision of the two eyes can be fixed squarely upon the corresponding points while the eyes are looking along parallel or convergent lines, and the brain will translate or fuse the images into a single three-dimensional picture, with much less eye strain than in the case of divergent viewing. But even with parallel or convergent viewing, some degree of eye strain will be caused unless the maximum lateral separation of any two corresponding points of the two plane reproductions is sufficiently slight so that the angle of convergence to any two corresponding points of the two plane reproductions differs only very slightly or not at all from the angle of convergence when similarly viewing the actual three-dimensional object. When an observer looks at an actual three-dimensional object and fixes his vision upon one particular spot or point of such object, his two eyes are looking at the same identical point (with no lateral separation, of course) and the eyes automatically accommodate themselves both in the distance focusing action and in the converging action, so as to converge the two lines of sight in a manner or to a degree so that they intersect each other at the point on which the observer has fixed his vision. Anything different from this, any amount of separation of the point on which the vision of the left eye is fixed as compared with the point on which the vision of the right eye is fixed, is obviously an unnatural situation in that it interferes with the physiological balance of the distance focusing adjustment with the convergent adjustment to which the human eyes have become accustomed by long usage and practice. Hence any separation of corresponding points in the two plane reproductions, which causes the eyes, when viewing the plane reproductions, to converge to a greater extent or a lesser extent than they would converge if looking at the same points in the natural three-dimensional object or scene, will necessarily create an unnatural situation resulting in some degree of eye strain even though it may be imperceptible, and the extent of the eye strain will be roughly in proportion to the amount by which the convergence of the lines of sight, when looking at the plane reproductions, differs from the convergence of the lines of sight when looking at the original three-dimensional objects represented by these plane reproductions.

It becomes, therefore, highly important (for the purpose of minimizing eye strain on the part of the observer) to correlate the convergence of the optical axes of the projected beams of light of the two plane reproductions, on the one hand, with the distance from the projection apparatus to the viewing screen, on the other hand, so that the desired point or points of one reproduction on the viewing screen will be superimposed exactly on the corresponding point or points of the other or companion reproduction on the viewing screen.

This illustrates the importance of the question as to what particular point or points of one reproduction should be superimposed on the corresponding point or points of the other reproduction. It will be readily recognized by those skilled in the art that it will be impossible to superimpose all points on one reproduction directly on all corresponding points on the other reproduction, if any stereoscopic effect is to be produced. If the two companion reproductions could be superimposed on each other at all points, then the two reproductions would simply be duplicate pictures, rather than pictures taken from two slightly different points, and no stereoscopic or third-dimensional effect would be produced in the mind of the person viewing them.

One of the features of the present invention resides in a novel method of superimposition of the two plane reproductions. It will be readily understood that, in the two companion plane reproductions, all points in a common plane at a given distance from the camera which took the companion pictures can be accurately superimposed on each other, but no points in any other plane at any other distance from the taking camera can be accurately superimposed on each other, the degree of disconformity varying in proportion to the distance of such other plane from the one plane chosen for accurate superimposition purposes. The customary prior practice has been either to superimpose, on the projection screen, either the geometrical centers of the two pictures, or the margins of the two pictures, or those points of the two pictures which are at theoretical infinity distance from the taking camera, or those points of the two pictures which are most significant and which constitute the center of interest of the scene being depicted. The first three procedures permit a single setting of the projection apparatus at commencement of the projection, without requiring further adjustment during projection, but have the disadvantage of being likely to cause considerable eye strain, particularly when viewing objects relatively near to the taking camera. The fourth procedure has the disadvantage of requiring constant attention and adjustment by the projectionist as the projection proceeds from one scene to another.

The present invention discards these prior procedures. In place of these prior practices, the novel method of the present invention is to superimpose accurately on each other, at the viewing screen, those points of the two companion plane reproductions which represent points in a plane at a fixed distance from the taking camera, such that the degree of ocular convergence to this plane of superimposition is the average of or midway between the degrees of ocular convergence from the location of the taking camera to objects in the foreground of the picture and to objects in the background of the picture.

It can be demonstrated geometrically or trigonometrically that the degree of ocular convergence to any point at a finite distance from the observer is the average or mean of the respective degrees of ocular convergence to a point at an infinite distance and to a point at one-half the distance of the first point. Or, stating it the other way, if it is desired to find the point at which the ocular convergence is the average of the extremes of ocular convergence to any given foreground point and to a background point at infinity distance, such desired point is at a distance from the observer twice as great as the distance of the given foreground point.

Stereoscopic projection apparatus, although useful for many types of pictures, is used largely for projecting landscape scenes in which the foreground objects are likely to be about ten feet from the taking camera and the background objects are likely to be at infinity distance, photographically speaking. Also, when stereoscopic projection apparatus is used in the average home, the viewing screen is likely to be about ten feet from the observer, which is another reason for selecting ten feet as the theoretical foreground distance for purposes of the present invention. It is seen from the foregoing discussion that if the foreground distance is taken as ten feet and the background distance is taken as infinity, a plane at a distance of twenty feet from the taking camera may be used as the plane of superimposition of corresponding points of the two projected images, and this is the superimposition which is preferred according to the method of the present invention, for projectors for ordinary home use.

It will be realized, however, that in the broader aspect of the invention, superimposition should be achieved of those points which are spaced from the taking camera at the distance of average ocular convergence between the extremes of ocular convergence to foreground points and ocular convergence to background points. While the superimposition distance of twenty feet gives substantially this optimum result in projectors intended for home use in projecting landscape scenes, and enables projectors to be built identically by economical mass production methods, yet it should be realized that it is within the broad scope of the present invention to make special projectors designed to produce superimposition of those corresponding points of the projected stereographs which represent points at some distance other than twenty feet from the taking camera. For example, medical stereographs might represent objects at a minimum foreground distance of 24 inches from the taking camera and at a maximum background distance of 30 inches from the taking camera. In a special projector designed for projecting such stereographs with minimum eye strain, the distance of average ocular convergence would be 26.67 inches, and such a projector is designed, according to the present invention, to superimpose on the viewing screen the companion stereographic images of those objects at a distance of 26.67 inches from the taking camera.

Since superimposition of corresponding points of the projected right and left stereographic images is achieved, according to this invention, with respect to objects at a fixed distance from the taking camera, it follows that when the desired superimposition is once attained at the beginning of the projection operation, it remains fixed throughout the projection run and it is not necessary for the projectionist to make any adjustment from scene to scene as the center of interest varies in distance from the taking camera. This superimposition may be attained either by a manual initial adjustment of the projection apparatus or, preferably, by so designing the projection apparatus proportions with relation to the lateral spacing of the stereographs to be used in the apparatus that this superimposition will always result when projecting such stereographs, without the need for nor any provision for superimposition adjustment. Also, this novel projection method of the present invention has the important advantage that, under average conditions, this method produces less eye strain than the other methods heretofore commonly used, as can be shown both experimentally and by theoretical considerations.

As for the theoretical considerations, it is seen that if the objects whose right and left stereographic projected images are superimposed on the viewing screen are those objects which are at the average ocular convergence distance from the taking camera (that is, the distance at which the ocular convergence angle is the average of the ocular convergence angles to the nearest and farthest objects) then when the eyes of the viewing observer are focused on such superimposed images, minimum movement of the eyes is needed to focus them on the respective projected images of objects at either maximum background distance or at minimum foreground distance. Also the lateral separation of the respective right and left images of those objects which are nearest to and farthest from the camera, is substantially equal and is as small as is feasible, with regard to both the nearest and farthest objects. If superimposition were achieved with respect to the right and left images of objects closer to the camera, there would be less lateral spacing of the right and left images of objects at minimum distance, but the lateral spacing of objects at maximum distance would be undesirably increased; and vice versa if those objects whose images are superimposed were farther from the camera.

By thus keeping the lateral separation of the companion right and left images of all objects (both at minimum and at maximum distances from the camera) down to the minium practicable limits, the eyeball muscles of the observer need make only minimum accommodation movements and convergence movements when attention is shifted from an object at one distance from the camera to an object at another distance from the camera, consequently resulting in less eye muscle fatigue and less eye strain, and in most comfortable viewing.

Or, stating it another way, consider that the observer's eyes are focused on accurately superimposed right and left projected images of an object at the average ocular convergence distance from the taking camera (case 1). Now if the observer wishes to shift his attention to an object at maximum background distance (case 2) or to an object at minimum foreground distance (case 3) from the taking camera, the right and left images of these objects in cases 2 and 3 will not be directly superimposed on each other (on the viewing screen) but will be laterally separated or spaced to such a degree that when the observer focuses his attention in case 2, the convergence angle of the lines of sight from his eyes increases from the case 1 position, by the same amount that the convergence angle decreases from the case 1 position when attention is focused as in case 3. Thus, because equal angular movements of the eyeballs are performed to shift attention from the accurately superimposed images to the images of objects at either maximum or minimum distances, this would seem theoretically to be the most natural and restful superimposition practice or method for the average individual to use in viewing average pictures stereoscopically.

Also, if the observer happens momentarily to see both projected images with both eyes (as when tilting the head sideways while wearing polarizing spectacles) the picture images will appear to jump back and forth in an annoying and unpleasant manner as the head is tilted, particularly if there is relatively great lateral separation of the images of either the foreground objects or the background objects. But with the present invention, when neither the foreground nor the background object images are widely spaced, this jumping of the picture images upon tilting the head is greatly reduced and the annoyance thereof is greatly lessened.

The above mentioned theoretical considerations are well borne out by actual tests or experiments performed by different observers viewing projected stereoscopic pictures with different superimopsition systems employed. It has been found in these tests that for the average observer with normal vision, the least eye strain and fatigue and the greatest pleasure of viewing are usually secured by exactly superimposing, on the viewing screen, the images of points which were at the average ocular convergence distance from the taking camera. These tests also show that for average observers viewing home projection of average landscape scenes, the selection of a distance of twenty feet from the taking camera as the superimposition plane distance is in accurate conformity with or in very close approximation to the theoretical average ocular convergence distance, and that such procedure works extremely well in practice, resulting on the whole in restful, relaxed, and pleasurable viewing to a greater extent than when other superimposition procedures are employed. As already indicated, this use of the average ocular convergence distance for superimposing purposes, and more specifically the use of the twenty foot distance, are among the important features of the present invention.

The method aspects of the present invention include not only the generic method or procedure of superimposing the companion right and left images on the projection screen as above outlined, but also the specific methods by which this superimposition is accomplished, and more particularly the specific method by which the superimposition is accomplished concomitantly with accurate focusing both of the left projected image or reproduction and the right projected image or reproduction. This specific method includes the feature of so mounting the stereograph transparencies in the holder that those corresponding points of the two transparencies which are to be accurately superimposed upon each other on the viewing screen, are laterally spaced from each other in the projector by the same distance as the lateral spacing of the optical centers of the two projection lens assemblies when they are in their infinity-focused positions, plus the feature or step of providing a related pair of focusing transparencies suitable for projection in the projector and having right and left images or indicia of a single line or other suitable fixed index mark, the right and left indicia being spaced from each other in the projector by the same distance as the lateral spacing of the optical centers of the two projection lens assemblies when they are in their infinity-focused positions, and the further steps of concurrently focusing the right and left projection lens assemblies by moving them backwardly or forwardly (relative to the illuminated transparency) along paths of focusing travel which are not parallel to each other but which converge toward each other in a forward direction, by the proper theoretical amount to cause the central rays of the left projected beam and the right projected beam to intersect each other at the distance from the projector for which the projection lens assemblies are focused. In other words, the paths of focusing travel of the projection lens assemblies are so designed that the degree of convergence of the two projected light beams is a function of the distance for which the projection lens assemblies are focused. From this it follows that when the projected images of the reference lines or points on the right and left transparencies are exactly superimposed on each other, on the screen, the two projection lens assemblies are both properly focused on the projection screen, and whenever these two projected images are not exactly superimposed on each other, one or both of the two projection lens assemblies will not be properly focused on the projection screen. But the two projection lens assemblies are operatively connected to each other, according to the present invention, so that both of them are moved together and equally in their focusing movements. Hence if one is not properly focused, both must be out of focus, and when one is in proper focus, so is the other.

Thus the present method comprises the projection of the right and left reference images from the transparencies onto the viewing screen, and the concomitant adjustment of both projection lens assemblies forwardly or backwardly, as the case may be, until the right and left images of the reference points on the projection screen coincide exactly with each other. When this is done, the lens assemblies not only will be properly focused on the viewing screen, but also will be so adjusted as to superimpose, on the viewing screen, those corresponding points of the right and left stereograph transparencies which are laterally spaced from each other by the same distance as the lateral spacing of the optical centers of the projection lenses when in their infinity-focused positions.

The above mentioned reference points on the focusing transparencies may be produced either by actually photographing, through the stereoscopic camera, thin vertical lines, or by what may be called a synthetic manufacturing process, producing the reference points on the right and left focusing transparencies by making artificial markings on the transparencies at the correct distance from each other. Either manner of making the transparencies is acceptable according to the present invention. The reference markings may be in the form of pins, wires, or other suitable objects supported from the edges of a window opening (which may be referred to broadly as a transparency) or may be slits in an opaque sheet, and need not necessarily be lines formed on a transparent sheet.

The invention also includes simple, efficient, and novel apparatus for carrying out the above mentioned methods of the invention. The principles of operation of the apparatus, as well as further details of the method aspects of the invention, can best be understood by referring now to Fig. 8 of the drawings, constituting a diagrammatic representation in plan of the projection apparatus, and the projection screen or viewing screen.

In the projector, here indicated only schematically, light from opposite sides of an incandescent bulb light source 53 is collected by the two collector lenses 54, thence is bent forwardly by the two mirrors or other suitable reflecting means 55 to form two forwardly extending parallel beams passing through the respective condensing lenses 56 and polarizing screens 57, the latter being differentially oriented so that the left projected beam is plane polarized in one plane (such as a vertical plane) while the right projected beam is plane polarized in a different plane at right angles thereto (such as a horizontal plane). Beyond the polarizing screen 57, the two forwardly projecting light beams pass through the two companion stereoscopic transparencies 51 in the transparency holder 52, which holder may conveniently be an approximately circular disk of the general form disclosed in United States Patent 2,189,285, granted February 6, 1940, for an invention of Wilhelm B. Gruber. Certain features of the projector thus far described are disclosed and claimed in the copending United States patent application of Wilhelm B. Gruber, Serial No. 758,140, filed June 30, 1947, now patent 2,525,598, granted October 10, 1950.

At 50 there are shown diagrammatically the two projection lens systems or assemblies, for projecting the right and left beams from the right and left transparencies. For convenience and simplicity of illustration, each of the two lens assemblies is indicated in Fig. 8 as a simple bi-convex lens, but it will be understood that in actual practice a projection lens assembly of several optical elements is ordinarily used, all of the elements being mounted in a suitable mount or casing. The term "lens" as hereinafter used is intended to embrace either a single lens or the more usual assembly of a plurality of lenses, except where a contrary meaning is obviously required by the context.

The full line positions of the projection lenses 50, in Fig. 8, represent diagrammatically the positions they assume when focused at infinity; that is, focused to project the transparencies 51 on a screen placed at infinity distance ahead of the projection lenses. The optical axes of projection, when the lenses are focused at infinity, are indicated at 151 for the left lens and 152 for the right lens. These two optical axes 151 and 152 are parallel to each other. Since parallel lines may be considered geometrically to meet at infinity, it may be said that the two pictures projected by the right and left lenses will be superimposed on each other at infinity.

To focus the projection lenses on a viewing screen at any finite distance forwardly from the lenses, the lenses must, of course, be moved slightly forwardly from their infinity focused positions shown in full lines in Fig. 8. The closer the screen is placed to the projector, the farther forwardly must the projection lenses be adjusted, according to known optical principles. Likewise, if the image of a selected point on one transparency is to be superimposed, at the screen, on the image of the corresponding point on the other transparency, the axes of projection must converge toward each other, and obviously the convergence must be greater as the screen is moved closer to the projector, and must be less as the screen is moved farther away from the projector. Hence as the projection lens assemblies move forwardly to focus the projected images on a closer screen, they should also move laterally toward each other to produce the convergence required for superimposing the images on this closer screen; and vice versa, if the projection lens assemblies are moved rearwardly to focus the projected images on a more distant screen, they should move laterally away from each other to decrease the convergence of the projected beams of light, so as to produce superimposition on the more distant screen.

The distance through which each lens assembly must move forwardly from its infinity focused position, in order to focus the projected image at any screen closer than infinity, is shown by the formula $$x = \frac{f^2}{v - f} \quad (1)$$

in which $x$ is the distance through which the lens assembly moves forwardly from its infinity focused position; $v$ is the distance from the optical center of the lens assembly to the viewing screen on which the image is to be focused; and $f$ is the focal length of the lens, if a single projection lens is used, or the equivalent focal length of the lens assembly if (as is usually the case) an assembly of several lens elements is employed.

In order to produce the proper convergence of the beams of light, the projection lens assemblies must move inwardly toward each other as they move forwardly, as above mentioned, to an extent which, for any given distance of the screen, is found by the formula $$y=\frac{P}{2}\left(1-\frac{f}{v}\right) \qquad (2)$$

in which $y$ is the distance of the optical center of the lens from the center line of the projector, and P is the distance of lateral separation of those corresponding points of the two companion transparencies (right and left) whose images it is desired to superimpose accurately upon each other, at the viewing screen, this distance being the same as the distance between the optical centers of the two lenses when they are focused at infinity.

As already intimated, it is sometimes desired to magnify or otherwise distort the depth or third dimensional appearance of projected stereoscopic pictures for use in aerial mapping or for military reconnaissance purposes. But for ordinary viewing purposes for pleasure or entertainment, such distortion is not desired, and so, in order to avoid distortion, the centers of the pair of transparencies (and the optical centers of the two projection lenses, when focused at infinity) should be spaced laterally from each other by a distance approximately equal to the average human interpupillary distance, which may be taken for present purposes at 65.3 millimeters or 2.57 inches. Hence, in the above equation, P becomes a constant, and is equal to 2.57 if all of the quantities are expressed in inches. The focal length of the lens, $f$, is also a constant, and may be assumed, for purposes of the present example, to be 3 inches. Thus it is seen that the only variables in these formulae are $x$, $y$, and $v$. For any given value of $v$ (the distance from the center of the projection lenses to the viewing screen) $x$ and $y$ have definite values.

Transposing above Equation 1 to obtain a value for $v$ in terms of the other quantities, it is seen that $$v=f+\frac{f^2}{x} \qquad (3)$$

Substituting this value of $v$ in Equation 2 in order to obtain the equation of the curve along which the lens assembly must be moved in order to accomplish the desired convergence of the rays simultaneously with the focusing for distance, we get $$y=\frac{P}{2}\left(\frac{f}{x+f}\right) \qquad (4)$$

which constitutes the equation of this curve, expressed in terms of the two variables $x$ and $y$, plus the constants P and $f$.

Now substituting the respective constants 2.57 and 3 for P and $f$, the equation becomes $$y=\frac{3.855}{x+3} \qquad (5)$$

which may be transformed to the more general or typical form $$xy+3y-3.855=0 \qquad (6)$$

The curve itself may now be drawn, from either of the Equations 5 and 6, or by calculating simultaneous values of $x$ and $y$ for various different values of $v$, using Equations 1 and 2. The resulting curve is shown in Fig. 6 of the drawings. It is seen that it is essentially a rectangular hyperbola, having assymptotes at the values of $y=0$ and $x=3$.

In actual practice, only a small fraction of this curve is useful, and need be considered in the construction of a practical stereoscopic projector. Obviously, the viewing screen can not be farther away from the projector than infinity position, and as a practical matter it is not closer than about eight feet as a minimum; hence the portion of the curve which is useful is only that portion between the limits of $x=0$ (corresponding to focusing on a screen at infinity distance) and $x=0.0968$ (which is the value of $x$ when $v$ is 96, the screen being eight feet distant from the projector). This small portion of the curve is indicated by legends on Fig. 6 and is reproduced on a much larger scale in Fig. 7 of the present drawings.

It is seen that this tiny fraction of the curve is almost a straight line, the curvature being scarcely visible even when the curve is drawn to several times its full scale. Actually there is a very slight curvature, as may be ascertained by calculating the value of the tangent of the curve at the extreme points $x=0$ and $x=0.0968$.

The tangent of the curve at any point on the curve is, of course, $$\frac{dy}{dx}$$

Let the angle of the tangent to the $x$ axis be designated as $\phi$. Differentiating the above Equation 6 we obtain $$\frac{dy}{dx}=\frac{-y}{x+3}=\tan \phi \qquad (7)$$

Or again, if it is desired to determine $\tan \phi$ in terms of the screen distance $v$, rather than in terms of $x$ and $y$, we may differentiate above Equations 1 and 2, and divide the differential of Equation 2 by the differential of Equation 1, which will give $$\tan \phi=\frac{dy}{dx}=\frac{P}{2}\left(\frac{v^2-2vf+f^2}{v^2 f}\right) \qquad (8)$$

Substituting the above mentioned values of the constants P and $f$, and solving the above Equations 1, 2, and 8 to obtain values of $x$, $y$, and $\phi$ for various selected values of $v$ between eight feet (96 inches) and infinity, we may construct a table of these values, as follows:

| $v$ in feet | $x$ in inches | $y$ in inches | $\phi$ |
|---|---|---|---|
| 8 | 0.0968 | 1.245 | 21°54′19″ |
| 15 | 0.0508 | 1.264 | 22°30′18″ |
| 20 | 0.0380 | 1.269 | 22°40′35″ |
| 50 | 0.0151 | 1.279 | 22°59′12″ |
| Infinity | 0.0000 | 1.285 | 23°11′39″ |

Figure 7:
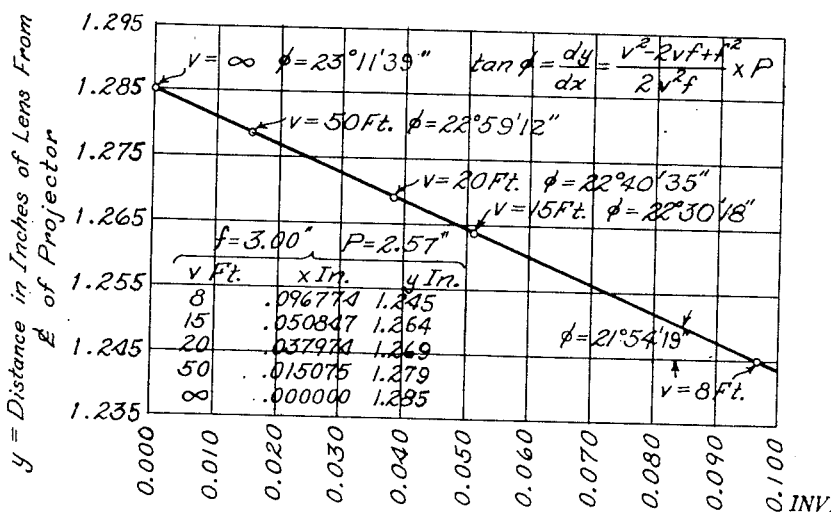
Fig. 7 is a chart illustrating a portion of the curve shown in Fig. 6 on a larger scale, together with certain numerical values and formulae.

These values are shown on the large scale graph constituting Fig. 7. It will also be seen from Fig. 7 and from the foregoing tabular values that the practical usable part of the curve is almost a straight line, since at one end of the curve, where $v$ is eight feet, $\phi$ is 21° 54′19″, and at the other end of the curve where $v$ is infinity, $\phi$ is 23°11′39″, the total curvature of this portion of the curve being something less than 1°18′. So for all practical purposes, this part of the curve is a straight line, bearing in mind that this portion of the curve just mentioned is something less than one-tenth of an inch in length, and has a maximum deviation from a straight line of less than 1°18′ in this length of one-tenth of an inch.

From the foregoing explanations of the shape and values of the curve it will be seen from the diagram in Fig. 8 that if the left and right projection lenses 50 are moved together from their infinity focused positions shown in full lines, along paths of travel indicated respectively at 153 and 154 (these paths corresponding to the practically usable portions of the above mentioned curve), then on a screen at any given distance from the projector on which the projection lenses are focused, the correct convergence will automatically be attained so that in addition to having the projected images sharply focused on the screen, the two projected images from the right and left projection lenses will be accurately superimposed in the desired manner. When the projection lenses are moved forwardly along the paths 153 and 154, they do not tilt or turn; their optical axes remain parallel to each other, but come closer together. The net result is that the central rays of the projected beams of light will be deflected inwardly toward each other, travelling along paths somewhat as indicated by the broken lines 155 and 156, which lines are intended to be merely schematic or suggestive rather than necessarily illustrating the actual course taken by the central rays.

A practical stereoscopic projector built in accordance with the above mentioned principles and operating according to the above described methods, will now be described with special reference to Figs. 1–5 of the drawings.

The projector comprises a suitable frame including a horizontal bed plate 10. Two plates 11 are mounted to slide on the horizontal top surface of the plate 10, each plate 11 having a vertical standard or rib 12 which supports the lens assembly holder or casing 13 containing the adjustable lens barrel 14 which holds the lens itself. The adjustability of the barrel 14 in the holder 13 is only for purposes of initial factory adjustment or other correlating adjustment in order that the two lens assemblies (right and left) may be properly matched with each other, and once they have been so matched, the barrel 14 remains fixed in its holder 13, the focusing adjustments and convergence adjustments being attained by sliding the plates 11 over the top surface of the plate 10.

It may be mentioned here that because of the precision focusing possible with the present invention, it is worthwhile to use high grade and highly corrected lens assemblies in the present projector. With conventional projectors, where focusing must be accomplished by visual inspection by the operator, focusing is, at best, so uncertain and variable, that it is usually not worthwhile to employ expensive projection lenses. But here, where absolutely accurate focusing is easily obtainable by any operator of normal intelligence, even without particularly keen vision on his part, the use of highly corrected and hence expensive projection lens assemblies is fully justified.

Each of the lens slides 11 is provided with a downwardly extending pin or stem 15 (Figs. 1 and 2) which projects through an opening 17 in the bed 10, with ample clearance around the stem for a fair degree of lateral movement. Surrounding the stem 15 is a thrust plate 18 bearing against the lower surface of the bed plate 10 and firmly pressed upwardly against it by a spring washer 19 suitably retained on the stem 15 near its lower end.

The lower end of the stem 15 is provided with a reduced portion 20 for engaging in a slot 21 (Fig. 3) of an actuating lever 22, there being two such levers, each having also slots 23 respectively fulcrumed on reduced bearing portions 24 of pivot studs which have heads 25 and main supporting portions 26, both of larger diameter than the reduced bearing portions 24. The axial length of each reduced portion 24, between the portions 25 and 26, is equal only to the thickness of the lever 22, plus a very slight clearance, so that the lever 22 is confined to movement in a horizontal plane parallel to the bed plate 10. The reduced portion 24 on one of the studs is at a slightly different elevation from the reduced portion 24 on the other stud, so that the two levers 22 oscillate in planes slightly offset vertically from each other, although quite close to and substantially in contact with each other.

These supporting members or studs 24, 25, 26 are mounted on a plate 27 which, in turn, is mounted by screws 28 at the lower ends of integral lugs or separate spacing sleeves 29 extending downwardly from the lower surface of the plate 10, from which they are supported.

An adjusting screw 36, having a readily accessible knurled head 35 at its forward end, is threaded through a tapped opening in the forward one of the supporting lugs 29 (see Fig. 3) and has a smooth cylindrical portion 37 passing through a smooth bearing hole in the rear supporting lug 30. The rear end of this adjusting screw is squared off, and butts against rounded operating ends 38 of the two adjusting levers 22, so that as the screw is screwed rearwardly, the overlapping central ends of these levers will be moved rearwardly, which will swing the levers so that the slots 21 move forwardly and thus cause forward movement of the stems 20 which are embraced in these slots, and of the lens holders 11, 12, 13 which are connected to and operated by these stems 20.

Both levers 22 have tails 40 extending rearwardly and connected to each other by a coiled tension spring 41 which constantly tends to turn these levers in a direction to keep the ends 38 against the rear end of the screw 36. Hence when the screw 36 is screwed forwardly the springs 41 will swing the levers 22 in a direction opposite to that in which they are moved by rearward screwing of the screw 36, and will restore the lens assembly holders rearwardly as far as permitted by the position of the adjusting screw 36.

For guiding the lens assembly mounting plates 11 in their movements over the top surface of the base plate 10, so that they will move accurately along the proper theoretical path of travel when the adjusting screw 36 is turned in one direction or the other, the mounting plates 11 are provided with downwardly extending guiding studs which fit snugly in accurate guiding slots in the plate 10. These guiding slots are preferably but not necessarily formed as continuations extending in opposite directions from the opening 17 through which the studs 15 extend. Guiding slots so formed are indicated at 45 in Fig. 2. In order to keep the optical axes of the lens assemblies always parallel to each other and prevent any accidental turning movements while they are being shifted, it is desirable to make these slots 45 of considerable length and to have two guiding studs from each lens assembly engaged in different portions of the slot 45 at a substantial distance from each other. This is the arrangement illustrated in Fig. 2. Although the maximum range of movement along the guiding slot is approximately one-tenth of an inch as above mentioned, yet the slot is of considerably greater length. One guide stud 46 extends downwardly from the slide plate 11 into the slot 45 near its rear end, and another guide stud also designated at 46 extends downwardly into the guiding slot near its forward end. Each guide stud is preferably provided with a hardened roller which bears snugly against opposite side walls of the slot 45.

It will be understood, of course, that the forward and rear branches of the slot 45 do not constitute successive continuations of portions of the theoretical curve above mentioned, but rather constitutes duplicates of the same portion of the curve, corresponding points of the two duplicates being simply offset from each other by a distance equal to the spacing between the two guide studs 46, both in the direction of the optical axis and in the direction perpendicular to the optical axis. If the studs 46 are so offset as to be alined with each other in the direction of the guide slot, then the forward and rear branches of the guide slot will be approximately continuations of each other, and can be easily and economically formed in the same milling operation or other appropriate slot forming operation. In practice, each guide stud 46 will move along its portion of the slot through a maximum distance of approximately a tenth of an inch, as already mentioned, and consequently, for practical purposes, it makes little difference whether, throughout this tenth of an inch, the slot 45 be formed in the exact shape of the theoretical curve, or whether it be formed as a perfectly straight slot, at the proper angle $\phi$ to the central optical axis of the projector. If a straight slot rather than a slightly curved one is employed, it would be formed at an angle $\phi$ which is equal to the average of the extreme values of $\phi$ given in the above table, and even with the use of such a straight slot, the accuracy of focusing and convergence which could be attained with the projector would be so far superior to the accuracy obtainable by the prior art that it constitutes a noteworthy advance satisfactory for all practical purposes. But a slight theoretical advantage would be attained if the slot 45 were formed in the true theoretical shape of the curve above mentioned, rather than being formed as a straight line.

With this arrangement, it is seen that as the viewing screen is brought closer to the projector, the knob 35 of the adjusting screw is turned in a direction to move the screw rearwardly so that the rear end of the screw presses against both of the adjusting levers 22 and turns them, against the force of the spring 41. The rear edges of the slots 21 of both levers bear against the rear sides of the studs 20, and cause forward movement of the respective lens mounts 11, 12, 13 which are connected to the respective studs, moving both mounts simultaneously and equally. As the mounts move forwardly, they move along a path or locus determined by the shape of the slots 45 in the base plate 10, which slots are in the shape of the theoretical curve shown in Fig. 7, as already explained. As the lens assemblies move forwardly to focus accurately upon a viewing screen at successively closer distances, they also move laterally inwardly or toward each other to produce the necessary convergence for superimposition, so that at any distance for which the images are focused, the proper superimposition of the right and left images on each other will be attained.

The necessary details of the curve of movement have been calculated, as already indicated, up to a screen distance of theoretical infinity. Even in large theatres, the projection distance is hardly ever more than one hundred feet to two hundred feet, and in ordinary home use (for which the projector is particularly designed) the average projection distance is usually about fifteen feet to twenty feet, hardly ever exceeding thirty feet. For all such distances, very high accuracy of focusing and superimposition is readily obtainable, and it is seen that the difference between a straight line and a theoretical curve for the guiding slots 45 is negligible.

In Fig. 2 of the drawings, only one of the guiding slots 45 is shown, the other being covered by the plate 11. It will be readily understood, of course, that the other guiding slot for the other lens assembly is a reverse duplicate of the slot which is illustrated, and converges toward the center line of the projector in a forward direction, just as does the slot 45 which is illustrated. This relation of the two slots is shown diagrammatically at 153 and 154 in Fig. 8.

The remaining optical features of the projector, besides those specifically described above with reference to Figs. 1–5, may be substantially the same as already mentioned in connection with Fig. 8, the parts 53—57 of Fig. 5 being the same as the already described parts bearing the same respective numerals in Fig. 8.

The projector also preferably includes an upstanding holder plate 161 between the polarizing filters 57 and the projection lens assemblies, which plate supports a disk holder 66 for holding the above mentioned well known form of disk carrying a number of companion pairs of stereoscopic transparencies, mounted for rotation about the axis of a stub shaft 67 by means of an oscillatory operating lever 68 projecting from one side of the apparatus and readily operable manually. Such disks carrying a number of companion pairs of stereoscopic transparencies are available on the market, and are commonly known as reels.

For accurate focusing, a dummy or focusing disk 60 (Fig. 10) is provided, carrying a pair of companion transparencies 61 and 62 which are respectively provided with fine vertical lines 63 and 64. Preferably the lines are formed as photographic images of differently colored threads, the line 63 representing, for example, a yellow thread, and the line 64 a blue thread.

When the projector is focused for infinity and is pointed toward a viewing screen at a finite distance from the projector, the images of the transparencies 61 and 62 will appear on the screen in partially overlapping relation, but with the reference lines 63 and 64 spaced laterally from each other as indicated in Fig. 11. As the focusing adjustment screw is turned to focus the projector for the distance at which the viewing screen is set, the reference lines 63 and 64 will be brought closer and closer to each other until, when the focusing is exactly right, the two lines will be exactly superimposed on each other as indicated by the single line 65 in Fig. 12. This superimposition will be readily observable to the operator even if the lines 63 and 64 are black lines, but if they are respectively yellow and blue, as in the preferred embodiment, then when they are superimposed accurately on each other the operator will see at 65 a single green line. By making the lines 63 and 64 as fine as possible, the adjustment of the lenses may be accomplished so accurately that a variation of even an inch or two in an image distance of twenty feet may be detected, since a fine margin of yellow or blue would show at one side of the green line.

To assure accurate placing of the reference line transparencies in the projector in order to secure maximum accuracy in focusing, the dummy disk 60 which carries the focusing transparencies is provided with an alining notch 69 (Fig. 10) which cooperates with a part of the projector to assure accurate orientation of the disk, and also is provided with a central opening 70 for receiving a locating pin or stub shaft (such as indicated diagrammatically at 67 in Fig. 4) for accurately positioning the center of the dummy disk. It may also be provided with the same feeding apertures 71 (Fig. 10) customarily used on stereoscopic view disks of the kind intended to be used in this projector, which apertures or notches 71 successively engage the rotary feeding lug actuated by the feeding lever 68, to turn the disk through a fraction of a revolution, to bring into proper alinement with the optical axes of the light beams the successive pairs of stereoscopic pictures which are on the actual picture disks, though ordinarily not on the dummy focusing disk.

Instead of accomplishing focusing by the use of transparencies having reference lines 63 and 64 (whether in black or in colors) it is possible, within the scope of the present invention, to employ other forms of reference lines or reference points whose projected images are to be superimposed on the screen for accurate focusing. For example, in Fig. 13 there is disclosed a slide 80 which may be permanently mounted in a suitable lateral guide-way in the projector. This slide has an elongated window 81 at one end, and an open notch 82 at the other end. A pin 83 projects upwardly from the lower edge of the window 81, near the right end thereof, and a pin 84 projects downwardly from the upper edge of the notch 82, also near the right end thereof. When it is desired to focus the projector, the slide 80 is moved leftwardly (when viewed as in Fig. 13) to bring the pins 83 and 84 centrally into the two projected beams of light; then focusing is accomplished by moving the adjusting screw 36, until the projected images of the pins 83 and 84 are exactly in line with each other and form vertical continuations of each other, without any observable lateral offset. The projector is then in the condition of being accurately focused on the screen. Then the slide 80 is shifted rightwardly (without removing it entirely from the projector) until the pins 83 and 84 are shifted laterally out of the field of view, whereupon a picture disk may be placed in the projector, and the projection and viewing of stereoscopic pictures may be commenced.

Another modification, somewhat similar, is illustrated in Fig. 14, where a slide 91 (which likewise may be permanently mounted in the projector) has a window 92 and an open ended notch 93. The window 92 and the left part of the notch 93 may be brought into line with the projected beams of light, by shifting the slide 91 rightwardly when viewed as in Fig. 14, in order to permit projection of stereoscopic pictures. For focusing purposes, the slide is moved leftwardly, thus bringing into the beams of light a vertical slit 94 which is placed a little to the right of the window 92, and a fine wire 95 which is placed across the notch 93 near the right end thereof. Focusing adjustment is then accomplished until the projected image of the line 95 is exactly alined with the light beam projected through the slit 94. The projector is then properly in focus. Upon moving the slide 91 to the right, to its ineffective position, projection of stereoscopic pictures may be commenced.

The pin arrangement 83 and 84, or the slit and wire arrangement 94 and 95, may be embodied in a special focusing reel (generally similar to the reel 60, Fig. 10) which is placed in the projector when focusing is to be done and removed from the projector when focusing is finished and pictures are to be projected, instead of being embodied in a slide permanently mounted in the projector. Likewise, the colored line arrangement 63 and 64 may, if desired, be embodied in a permanently mounted slide rather than in a removable reel.

It is seen that the lines 63 and 64, or the pins 83 and 84, or the slit 94 and wire 95, as the case may be, serve, when used in this projector, as range finding devices, operating on the principle of triangulation so that superimposition of these reference lines or reference points is achieved when and only when the projection lenses are focused for the exact distance at which the viewing screen is placed from them.

It will also be seen that although this focusing arrangement finds its greatest usefulness and value in a stereoscopic projector, yet it may also be used to good advantage in attaining accurate focusing of an ordinary non-stereoscopic projector, whether of still pictures or of motion pictures. A non-stereoscopic projector using the present invention for focusing purposes would have a second or supplementary projection lens located laterally to one side of the main or regular projection lens, just as two separate projection lenses are used side by side in a stereoscopic projector. The two lenses would be operatively connected to each other for conjoint focusing movement along paths of travel which converge to the proper degree in a forward direction, just as in the case of the stereoscopic projector. After accurate focusing had been completed, the beam of light through the supplementary lens would be blocked off (or turned off, if two separate light sources were employed) and pictures would be projected through the main lens just as though it were the only lens and as though the supplementary projection lens (used only when focusing) did not exist. In fact, the present stereoscopic projector may be used in this manner as a projector of non-stereoscopic pictures, if picture transparencies are placed in one of the projected beams of light and if the other beam of light is blocked off. Thus the disclosure of the present stereoscopic projector constitutes also a disclosure of the applicability of the present invention to, and its usefulness in, a non-stereoscopic projector.

It may be pointed out also that the convergence of the beams of light (whether in focusing or in picture projection) is dependent upon the lateral spacing of the two projection lenses from each other, relative to the lateral spacing of the two transparencies from each other. Although it is preferred, it is not absolutely necessary that the two lenses both move inwardly toward the center line of the projector as they move forwardly. The track or guiding slot of one of the lenses could be parallel to the center line of the projector, in which case the track or guiding slot of the second lens would be at twice as great an angle to the center line, the distance $$\frac{P}{2} - y$$

for any given value of $x$, being made twice as great as it is when the tracks of both lenses converge equally and inwardly toward the center line.

Regardless of the superimposition plane selected (that is, regardless of the distance from the taking camera to those objects whose projected images are to be superimposed on each other on the viewing screen), if accurate focusing according to the range-finder principles of the present invention is desired, the focusing reference points (63 and 64, or 83 and 84, or 94 and 95, as the case may be) should be spaced laterally from each other by the same distance as the lateral spacing of the centers of the projection lenses when they are at their infinity-focused positions. For accurate superimposition according to the present invention, those corresponding points of the two (right and left) stereographs whose images are to be superimposed on each other, should be spaced laterally from each other by the same distance as the lateral spacing of the centers of the projection lenses when they are at their infinity-focused positions. In other words, if it is desired (as preferred) to superimpose the projected images of those points or objects which are twenty feet from the taking camera, the two companion stereographs are so mounted in the transparency-carrying disk or slide that the two transparency images of a point twenty feet from the camera are laterally spaced by the same amount as the spacing of the lenses, when focused for infinity. If the two companion stereographs are mounted closer together than this, the images which are superimposed on the viewing screen will be images of points in a plane closer to the taking camera, while if the two companion stereographs are mounted farther apart than this, the images which are superimposed on the viewing screen will be images of points in a plane farther away from the camera.

Those who are not already well acquainted with stereoscopic principles may perhaps obtain a somewhat better grasp of the problems of superimposition, by studying Fig. 9 of the present drawings, which is a diagrammatic or schematic representation of the projected images of companion right and left stereographs or stereoscopic pictures of a landscape scene, superimposed on a viewing screen. At the point 59, the image of a point which was twenty feet from the taking camera when the pair of stereoscopic pictures were taken, there is exact superimposition. There is also exact superimposition of the right and left images of the tree and the bush appearing to the left and right of the point 59, these objects also being at twenty feet from the taking camera. But for objects in the background, such as the mountain range, the image as taken by the left lens of the camera and projected by the left lens of the projector, is displaced leftwardly (as indicated in solid lines) relative to the image as taken by the right lens of the camera and projected by the right lens of the projector (as indicated in dash lines). Similarly, the two boulders in the foreground are displaced in the opposite direction, the images taken by the left camera lens and projected by the left projector lens being (as shown in full lines) displaced to the right of the corresponding images (dash lines) taken by the right camera lens and projected by the right projector lens.

A stereoscopic effect will still be produced if some other distance rather than the preferred twenty foot distance is selected for exact superimposition of the images, but greater eye strain will usually result, and the twenty foot superimposition distance is preferred, according to the present invention, for maximum pleasure and least eye strain of viewing average pictures by average people, for the reasons above mentioned.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A projector for projecting onto a viewing screen substantially superimposed images of a companion pair of stereograph objects, said projector including means for holding said pair of stereograph objects in side by side relationship in position to be illuminated, a pair of substantially twin objective lenses of substantially equal focal length mounted in substantially side by side relationship in front of said objects to project images of said objects forwardly onto a viewing screen at a variable distance from said lenses, single operating means for moving both of said lenses simultaneously forwardly and backwardly to focus said images upon a screen at a closer or farther distance from said lenses, and means operating concomitantly with the forward and backward movement of said lenses for varying the lateral spacing between said lenses to cause substantially the same degree of superimposition of the images of said objects when the lenses are focused on a viewing screen at various different distances from said lenses, said lenses being held with their optical axes parallel to each other during their entire range of forward and backward movement.

2. A projector as described in claim 1, in which said single operating means for moving both lenses comprises a manually operable adjusting screw, a separate lens holder for each of said lenses, and two levers, one pivotally connected to each of said lens holders, said levers having portions in close proximity to each other and both alined with said adjusting screw in position to be acted upon simultaneously by an abutting end of said screw.

3. A projector as described in claim 1, in which said means for varying the lateral spacing between said lenses includes two tracks for guiding the forward and backward movements of the two lenses, said two tracks converging toward each other in a forward direction, said tracks being of such shape relative to each other that as said lenses move back and forth to focus upon viewing screens at different distances, the lateral separation of their optical centers from each other is approximately that indicated by the equation $$y = \frac{P}{2}\left(\frac{f}{x+f}\right)$$

in which $y$ is one-half the distance of lateral separation of the optical centers of the two lenses from each other when they are in a position focused upon a viewing screen at any selected forward distance, $x$ is the forward distance between the optical center of each lens, when at said position, and the optical center of such lens when at its infinity-focused position, $f$ is the focal length of each of said lenses, and $P$ is the distance of lateral separation of the optical centers of the two lenses from each other when they are at their infinity-focused positions.

4. A projector as described in claim 1, in which said means for varying the lateral spacing between said lenses includes two tracks for guiding the forward and backward movements of the two lenses, said two tracks converging toward each other in a forward direction, said tracks being of such shape relative to each other that as said lenses move back and forth to focus upon viewing screens at different distances, the lateral separation of their optical centers from each other is approximately that indicated by the equation $$y = \frac{P}{2}\left(1 - \frac{f}{v}\right)$$

in which $y$ is one-half the distance of lateral separation of the optical centers of the two lenses from each other when they are in a position focused upon a viewing screen at any selected forward distance, $v$ is the forward distance from the optical center of each lens to the screen on which it is focused, $f$ is the focal length of each of said lenses, and $P$ is the distance of lateral separation of the optical centers of the two lenses when they are at their infinity-focused positions.

5. A projector as described in claim 1, in which said companion pair of objects are a pair of reference points on a focusing side, so related to each other that when the projected images of said reference points are accurately superimposed on each other on a viewing screen, said objective lenses will be accurately focused on said screen.

6. A projector for projecting onto a viewing screen substantially superimposed images of a companion pair of stereographs, said projector including means for holding said pair of stereographs in side-by-side relationship in position to be illuminated, a pair of substantially twin objective lenses of substantially equal focal length mounted in substantially side-by-side relationship in position to project images of said illuminated stereographs forwardly onto a viewing screen at a variable distance from said lenses, non-parallel guide means for guiding said objective lenses along forwardly converging and rearwardly diverging paths of focusing movement, focus adjusting mechanism for moving both of said lenses concomitantly along said focusing paths and maintaining the axes of said lenses substantially parallel to each other, and means for removably holding a pair of reference points behind said lenses in position to have images of said reference points projected by said lenses forwardly onto said viewing screen, said reference points being so related to each other and to said non-parallel guide means that when the projected images of said two reference points are accurately superimposed upon each other on a viewing screen at any given distance, said objective lenses will be accurately focused upon such screen.

7. A stereoscopic projector for projecting onto a viewing screen the images of companion pairs of stereographs arranged approximately diametrically on a rotary mounting disk, said projector including means for holding a pair of movable projection lenses in substantially parallel and laterally separated relationship to each other, non-parallel guide means for guiding said projection lenses along forwardly converging and rearwardly diverging paths for focusing movement within the focusing range, while maintaining said projection lenses with their optical axes parallel to each other in all positions within said focusing range, means including at least one electric light source and a pair of condenser lenses for projecting two substantially parallel beams of light in position to pass forwardly through lenses held in said lens holding means, means for holding a stereograph mounting disk for rotation in a plane approximately perpendicular to said projected beams of light about a rotary axis approximately midway between and approximately parallel to said projected beams of light, and means for moving both of said projection lenses concomitantly forwardly and backwardly along said non-parallel guide means for focusing on viewing screens at different distances from said projector, said non-parallel guide means serving to move said projection lenses laterally closer to each other as they move forwardly in focusing upon a screen at a closer distance and laterally away from each other as they move rearwardly in focusing upon a screen at a farther distance while maintaining the optical axes of said projection lenses parallel to each other throughout their forward and rearward focusing movements.

8. A projector as defined in claim 7, in which said means for holding a stereograph mounting disk includes a stub shaft on said projector adapted to enter a central opening in said disk.

9. A projector as defined in claim 7, further including means on said projector for rotating a stereograph mounting disk held by said disk holding means with a step-by-step rotary motion about its said rotary axis.

10. A projector as defined in claim 9, in which said means for rotating said disk includes a lever mounted for oscillation on said projector and movable through successive strokes to turn said disk on its rotary axis through successive steps to bring successive pairs of stereographs on said disk into said projected beams of light.

11. The combination of a base, a pair of projection lenses, means for mounting said lenses on said base for concurrent focusing movement relative to said base from infinity-focused positions forwardly and laterally converging toward each other to positions focused upon a projection screen at less than infinity distance from the lenses, said means for mounting said lenses including guide means for maintaining the optical axes of said projection lenses parallel to each other throughout the range of focusing movement of said lenses, illuminating means for projecting beams of light forwardly through said lenses, and means for holding a pair of companion photographic stereographs in said beams of light rearwardly of said lenses and in such positions that corresponding points of said stereographs representing objects at approximately the average ocular convergence distance of foreground and background objects represented in said stereographs, are laterally spaced from each other by the same distance as the lateral spacing of the optical centers of said projection lenses when they are in their infinity focused positions.

12. An easy-focusing stereoscopic projector for projecting stereoscopic images onto a viewing screen at a variable distance from the projector, including a holder for holding a pair of stereographs to be projected, two projection lens assemblies mounted in front of the respective stereographs with the optical axes of the lens assemblies parallel to each other, the lens of each lens assembly being substantially a duplicate of the other, said lens assemblies being mounted for backward and forward movement toward and away from said holder in order to focus the images of said stereographs upon a viewing screen at a variable distance from said holder, a single manually operable member operatively connected to both of said lens assemblies to move both of them backwardly and forwardly simultaneously through equal distances for focusing, a pair of guiding tracks along which said lens assemblies move during their focusing movements, said tracks converging forwardly and diverging rearwardly to shift said lens assemblies laterally toward each other as they move forwardly and laterally away from each other as they move rearwardly in response to operation of said single manually operable member, the optical axes of said lens assemblies remaining always parallel to each other as they move along said tracks, and a pair of focusing stereographs removably fitting into said holder, each of said focusing stereographs having a relatively small reference point whose image may be projected through its associated lens assembly onto a viewing screen, the convergence of said guiding tracks being at such angle that whenever the images of both reference points as projected onto a viewing screen at an unknown distance from the projector are brought into superimposed relation to each other by operation of said single manually operable member, said lens assemblies will be correctly focused for the distance of said viewing screen.

13. A construction as defined in claim 12, in which said guiding tracks are so shaped that said lens assemblies move during their focusing movements along paths defined substantially by the equation $$y = \frac{P}{2}\left(1 - \frac{f}{v}\right)$$

in which $y$ is one-half the distance of lateral separation of the optical axes of the two lens assemblies from each other when they are positioned to focus the images of said projection slide upon a viewing screen at any selected forward distance, $v$ is the forward distance from the optical center of each lens assembly to the screen on which it is focused, $f$ is the focal length of each of said lens assemblies, and $P$ is the distance of lateral separation of the optical axes of the two lens assemblies from each other when they are at their infinitely-focused positions.

References Cited in the file of this patent

UNITED STATES PATENTS

| | | |
|---|---|---|
| 288,025 | Colt | Nov. 6, 1883 |
| 1,204,425 | Gall | Nov. 14, 1916 |
| 1,259,365 | Cooper | Mar. 12, 1918 |
| 1,271,929 | Nelson | July 9, 1918 |
| 1,308,207 | Tolles et al. | July 1, 1919 |
| 1,503,766 | Pictet et al. | Aug. 5, 1924 |
| 1,596,835 | Hewson | Aug. 17, 1926 |
| 1,686,463 | Owens | Oct. 2, 1928 |
| 1,755,220 | Kochne | Apr. 22, 1930 |
| 1,806,190 | Arfsten | May 19, 1931 |
| 1,971,234 | Peppercorn | Aug. 21, 1934 |
| 2,189,285 | Gruber | Feb. 6, 1940 |
| 2,307,981 | Babcock et al. | Jan. 12, 1943 |
| 2,336,938 | Keijzer | Dec. 14, 1943 |

FOREIGN PATENTS

| | | |
|---|---|---|
| 9,507 | Great Britain | of 1908 |
| 590,815 | France | Mar. 26, 1925 |